(12) United States Patent
Maxham

(10) Patent No.: US 7,130,537 B1
(45) Date of Patent: Oct. 31, 2006

(54) SAFETY SHUTDOWN SYSTEM FOR A WDM FIBER OPTIC COMMUNICATIONS NETWORK

(75) Inventor: Kenneth Y. Maxham, Richardson, TX (US)

(73) Assignee: Alcatel, Paris (FR)

( * ) Notice: Subject to any disclaimer, the term of this patent is extended or adjusted under 35 U.S.C. 154(b) by 222 days.

(21) Appl. No.: 09/648,019

(22) Filed: Aug. 25, 2000

(51) Int. Cl.
*H04B 19/08* (2006.01)

(52) U.S. Cl. .................... 398/17; 398/157; 398/25

(58) Field of Classification Search .............. 359/133, 359/110; 398/27, 34, 181, 17, 157, 25, 129, 398/183, 133, 110
See application file for complete search history.

(56) References Cited

U.S. PATENT DOCUMENTS

| | | | | |
|---|---|---|---|---|
| 4,330,870 A | * | 5/1982 | Arends | 398/129 |
| 4,947,459 A | * | 8/1990 | Nelson et al. | 359/110 |
| 5,267,068 A | * | 11/1993 | Torihata | 359/110 |
| 5,557,265 A | | 9/1996 | Moothart et al. | |
| 5,995,256 A | * | 11/1999 | Fee | 398/34 |
| 6,008,935 A | | 12/1999 | Fujita et al. | |
| 6,061,173 A | * | 5/2000 | Yamane et al. | 359/345 |
| 6,160,649 A | * | 12/2000 | Horiuchi et al. | 359/110 |
| 6,504,630 B1 | * | 1/2003 | Czarnocha et al. | 359/110 |
| 6,599,039 B1 | * | 7/2003 | Nakazato | 398/25 |

FOREIGN PATENT DOCUMENTS

| | | |
|---|---|---|
| EP | 0 936 760 A2 | 8/1999 |
| EP | 1 006 682 A2 | 6/2000 |
| EP | 1 017 192 A1 | 7/2000 |

\* cited by examiner

*Primary Examiner*—David Payne
(74) *Attorney, Agent, or Firm*—Locke Liddell & Sapp LLP; Jessica W. Smith; V. Lawrence Sewell

(57) ABSTRACT

A fiber optic communications network includes multiple transmitters and multiple receivers connected by an optical WDM transmission link, the receivers having output channels for providing signals to terminal devices, each receiver including a demodulator to detect and recover a received signal, and the network includes at least one optical amplifier having a shutdown input for actuating the safety shut down of the network upon detecting a disconnect in the transmission line. The system includes circuitry connected to the output of each of the demodulators for sensing the presence of a valid signal and for determining whether a predetermined number of valid signals are present at the demodulators. If the number of valid signals detected is less than the predetermined majority number, the safety shutdown function is actuated.

13 Claims, 2 Drawing Sheets

SAFETY SHUTDOWN SYSTEM FOR A WDM FIBER OPTIC COMMUNICATIONS NETWORK

TECHNICAL FIELD OF THE INVENTION

The present invention relates to fiber optic WDM communications networks, and more particularly to a system and method for reliably activating a safety shutdown function in the event of a fiber optic transmission line disconnect or cut.

BACKGROUND OF THE INVENTION

The demand for communications capacity on fiber optic communications networks has resulted in increased use of wavelength-division multiplex (WDM) systems. WDM systems provide another level of multiplexing to individual or already multiplexed channels. In WDM systems, the individual transmission channels are carried on separate optical wavelengths and are combined in a single fiber at the optical link layer. WDM systems are generally used when the number of fibers in a transmission link is inadequate for the capacity or becomes a critical cost item.

The distances between WDM optical equipment and the signal transmission rates may be attenuation and/or dispersion limited. As a result, amplifiers are employed to boost signal strength to overcome these limitations due to losses from WDM devices, dispersion compensating fibers/gratings, connectors, splices, and fiber. As amplifier designs and WDM systems have evolved, so has the need for increased power grown. Optical power levels generated by fiber optic transmission systems can therefore be high enough to be hazardous to the human eye. If the transmission fiber is disconnected or accidentally cut or broken, the open end of the fiber can be emitting hazardous power, and this emission can possible be pointed into a person's eye. This power is higher when multiple optical channels are transmitted over a single fiber, as in WDM systems. Even higher power levels are generated when optical amplifiers are used.

Fiber optic transmission systems may employ a safety shutdown function which will shut down the optical output when the fiber is disconnected, cut, or broken. Such existing safety shutdown systems are based on the detection of input loss of power, which is then used to shut down the optical output. While the use of input power loss detection for control of safety shutdown is acceptable in certain systems, this method is not sufficiently reliable in WDM systems which are more complex. Added complexities in WDM systems can create, excessive system noise, and/or low levels of signal to noise ratios, which will in turn prevent safety shutdown based on detection of input loss of power. An example of a system with a high level of noise and/or low signal to noise ratio is a fiber optic transmission system which utilizes a Raman amplifier connected to the transmission fiber upstream of the receiver device to provide preamplification. Another example of a system with a high level of noise is one which uses bi-directional fiber operation. This type of system can have significant noise levels at the receiver due to high transmit power and Rayleigh back scatter in the transmission fiber. Even if these conditions do not cause an excessive noise level for preventing detection of a fiber cut or disconnect, when a fiber is broken, there is a significant possibility that the broken end will reflect a significant amount of the transmitted power, such that the receiver will see enough optical power that the receiver will not detect input loss of power, and therefore will not be able to activate the safety shutdown function.

Actuation of safety shut down functions can also fail due to having a fixed level for input loss detection, and received power levels that may be high or low depending upon different installations, transmission cable length, and transmission cable losses. If these variable levels for loss detection and shutdown control are adjustable through software, the failure rates due to software or processor failures maybe too high to meet reliability requirements.

A need has thus arisen for a system and method for reliably actuating a safety shut down function in a fiber optic transmission network where the network may utilize amplifiers such as, for example, Raman amplifiers, erbium-doped fiber amplifiers (EDFAs) and other remote pumped EDFAS for boosting signal strength in WDM systems.

SUMMARY OF THE INVENTION

In accordance with the present invention, in a fiber optic WDM communications network having a multiple channel WDM transmitter and a multiple channel WDM receiver connected by an optical transmission link, the WDM receiver having an optical splitter or devices with multiple output channels for providing signals to single channel terminal devices, each output channel including a demodulator to detect and recover a received signal, and the network including at least one optical amplifier having a shutdown input, a system is provided for actuating the safety shut down of the network upon detecting a disconnect in the transmission line. The system includes circuitry connected to the output of each of the demodulators for sensing and detecting the presence of a received signal and for determining whether a predetermined number of received signals are present at the output of the demodulators. If a majority of received signal detectors are detecting the absence of its channel signal, the safety shutdown function is actuated.

In accordance with another aspect of the present invention, a fiber optic communication network is provided. The network includes a transmitter and a receiver connected by an optical transmission line. The optical receiver demultiplexer or splitter includes multiple output channels for providing signals to single channel terminal devices. Each of the output channels includes a demodulator to detect and recover a received signal and for generating an output signal. An optical amplifier is coupled to the transmission line. The amplifier includes a shutdown input. Circuitry is connected to the demodulators for sensing and detecting the absence of received signal. Circuitry detects whether a predetermined number of the received signals are absent for generating a shutdown signal applied to the shutdown input of the amplifiers to thereby terminate amplifier operation.

A potential limitation or failure of a receive signal detector to detect loss or absence of the correct signal can be due to signal quality problems, such as, for example, increased noise levels and/or adjacent channel cross-talk in a dense WDM system. In bidirectional WDM transmission systems, reflections caused by broken fibers or dirty connectors can also result in some types of receive signal detectors failing to properly detect loss of its correct received signal channel, due to detection of a similar but incorrect signal due to this reflection and/or crosstalk problem.

In accordance with the present invention, a method is used for preventing the above-identified detection problems. Also in accordance with this invention a method for performing this more sophisticated detection with reduced failure rate, so that this technique can operate within the reliability limits for safety shutdown is provided. The receive signal detector is designed to declare loss of received signal by detecting the proper signal clock frequency and/or TDM frame pattern. This more sophisticated loss detection method may also include a detector for recognizing the pre-assigned unique signal trace code that is carried in each signal channel's overhead data. However, this more sophisticated detection method for detecting absence or loss of the correct signal has a failure probability that can exceed the reliability requirements for safety shutdown, due to component failures. The reliability requirements are based on the optical safety standards document IEC-60825-2, and the Telcordia reliability standards document TR-332. In accordance with the present invention, the failure probability is reduced by using a voting logic that can determine the occurrence of a fiber disconnect fault, based upon a majority or a predetermined number of received signals are absent. This voting logic can be implemented with a simple and reliable circuit, which virtually eliminates the failure probability factor due to failure of one of the multiple receive signal detectors.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
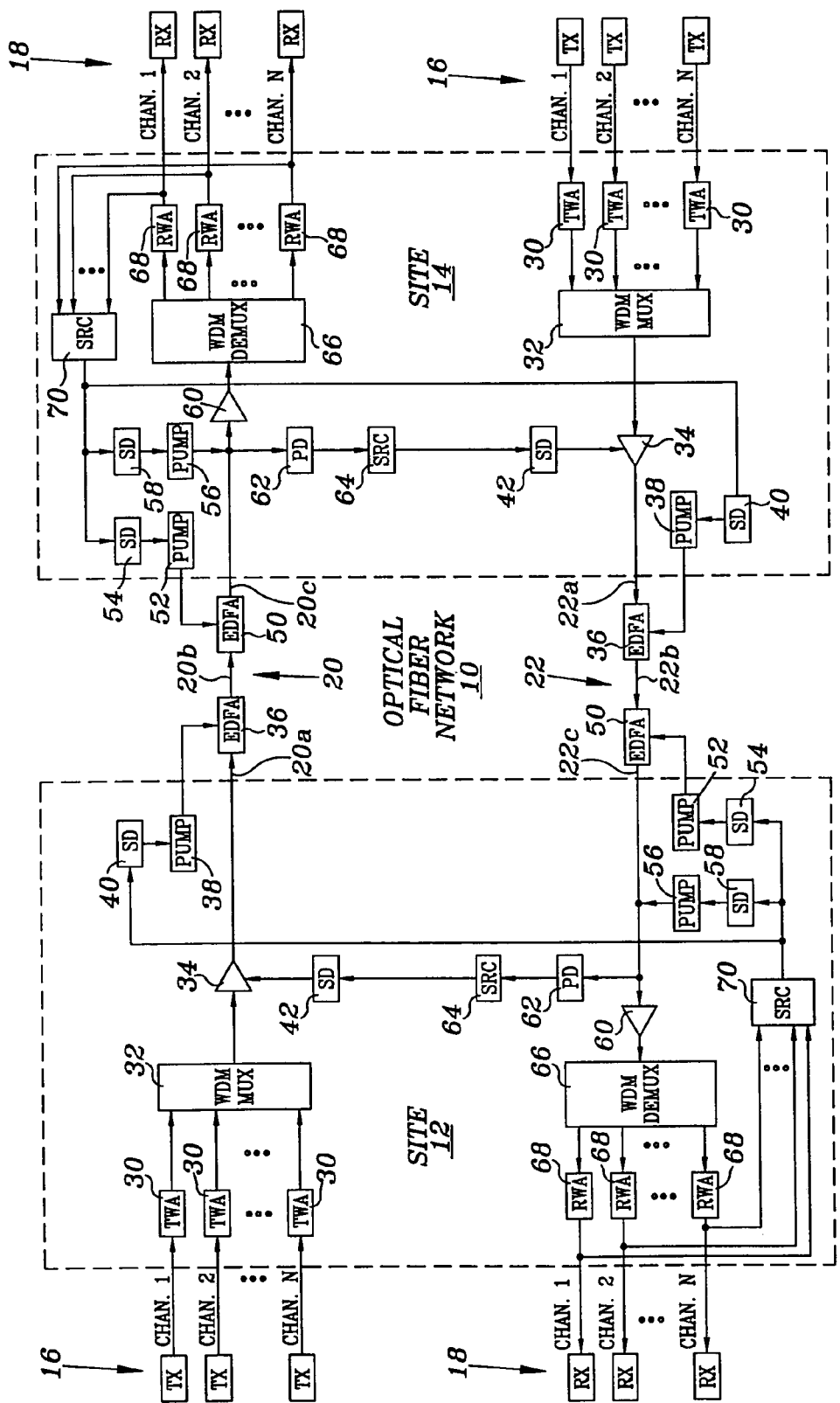
FIG. 1 is a block diagram of a fiber optic communications network utilizing the present system for actuating an optical safety shutdown function.

Referring to FIG. 1, an optical fiber transmission communications network is illustrated, and is generally identified by the numeral 10. Optical fiber transmission network 10 interconnects a site 12 to a site 14. Each site 12 and 14 includes a group of transmitters 16 and a group of receivers 18. Transmitters 16 of site 12 communicate with receivers 18 of site 14 via an optical fiber transmission line, generally identified by the numeral 20. Transmitters 16 of site 14 communicate with receivers 18 of site 12 via an optical fiber transmission line, generally identified by the numeral 22. Whereas network 10 has been illustrated utilizing two lines 20 and 22, the present invention can also be utilized in a bi-directional fiber transmission system.

Transmitters 16 located at sites 12 and 14 are similarly configured, and like numerals will be utilized for like and corresponding components. Similarly, receivers 18 located at sites 12 and 14 are similarly configured, and like numerals will be utilized for like and corresponding components of receivers 18. Transmitters 16 and receivers 18 are part of external terminal equipment devices or other transmission systems. As used herein, terminal equipment will include equipment as well as additional networks. Each transmitter input signal is applied to a transmit wavelength adapter (TWA) 30. Each TWA 30 is a transponder module which is used as an input interface device for each data channel as data enters network 10. The transponder module performs a series of functions: it receives and detects the incoming transmitter signal, and it regenerates the input signal, and transmits the data signal with a modulator and a wavelength-stabilized single-mode CW laser. The output of each TWA 30 is an individual wavelength that is applied to a WDM multiplexer 32 which combines the multiple 1-N wavelength channels into a composite multi-wavelength (multi-channel) signal for transmission. The output of multiplexer 32 is applied to an erbium doped fiber amplifier (EDFA) transmit optical fiber amplifier 34 whose output is applied to optical fiber transmission line 20a. An optional feature of this system is the connection of line 20a to a remotely pumped erbium-doped fiber amplifier (EDFA) 36 whose output is applied to line 20b. Remote EDFA 36 is pumped by a pump laser 38 located at site 12 having a shutdown control 40. Transmit optical fiber amplifier 34 also includes a shutdown control 42. The remote EDFA 36 is located in optical fiber network 10 at a distance several kilometers downsteam from EDFA 34. EDFA 34 and/or EDFA 36 may or may not be required, depending on the optical fiber network 10 span distance.

Receiver 18 at site 14 includes a remote EDF amplifier 50 actuated by a pump laser 52, located at site 14 having a shutdown control 54. Site 14 also is shown having a Raman pump laser 56 including a shutdown control 58. Although pumps 38, 52, and 56 are shown in FIG. 1, it is understood that only one or two of these pump lasers may be utilized in a WDM system, depending on fiber transmission network 10 span distance or span attenuation loss. The large amount of noise generated by the remote pumped EDF amplifiers and/or the Raman pump prevents the receive optical fiber amplifier's photo detector 62 from detecting loss of power. The photodetector 62 is connected at the input of EDF amplifier 60. Detection of loss of input power by photodetector 62 actuates a shutdown-restart control 64 which includes shutdown logic and a fail-safe restart timer to actuate shutdown control 42 and thereby terminate operation of transmit optical fiber amplifier 34 in transmitter 16 of site 14. For an optical fiber network configuration that does not include any components such as EDFA 36, EDFA 50, or Raman pump 56, then loss of signal due to a fiber cut in line 20 causes loss of power detection at receive optical fiber photo detector 62, and the associated transmit optical fiber amplifier 34 is then shut down. However, for an optical fiber network configuration that does include any component such as EDFA 36, and/or EDFA 50, and/or Raman pump 56, then the receive optical fiber photo detector 62 may not detect a reduction in received optical power that is significant enough to fall below the detector threshold to declare loss of power detection when there is a fiber cut in line 20 (at 20a, or 20b or 20c).

The output of amplifier 60 is applied to a WDM demultiplexer 66. The multiple outputs of demultiplexer 66 are each applied to the multiple receive wavelength adapters (RWA) 68. Receive wavelength adapter 68 includes a transponder module used as an output interface device for each data channel as data exits from the WDM system at site 14 via channels 1-N to terminal equipment receivers 18 at site 14. RWA 68 uses a high performance receiver to detect and recover the received signal, monitors the quality of the received signal, monitors the signal trace code, and regenerates the optical signal for sending signals out of WDM network site 14 to terminal equipment receivers 18 at site 14.

An important aspect of the present invention is the detecting of the received signals by the RWAs 68. Each RWA 68 can detect when the proper input signal is lost, even when there is optical power received that is in the receiver operating power level region. RWA 68 will declare a loss of signal if: (1) the received power is lost, (2) the received power is random noise, (3) the received power is a signal that is the wrong data rate or wrong frame format, and (4) if the received power is the correct data rate and format, but has the wrong identification code or signal trace code. The output of each RWA 68 is applied to a shutdown-restart control (SRC) 70 whose output is applied to shutdown controls 40, 54, and 58 thereby actuating these shutdown controls to terminate operation of pumps 38, 52, and 56, respectively, and shutdown operation of network 10. The absence of a predetermined number of output signals from RWAs 68, indicating a line 20 or 22 being disconnected, cut or broken, will result in a reliable and efficient mechanism to shut down the amplifiers of network 10 and to decrease optical power levels to safe levels.

Figure 2:
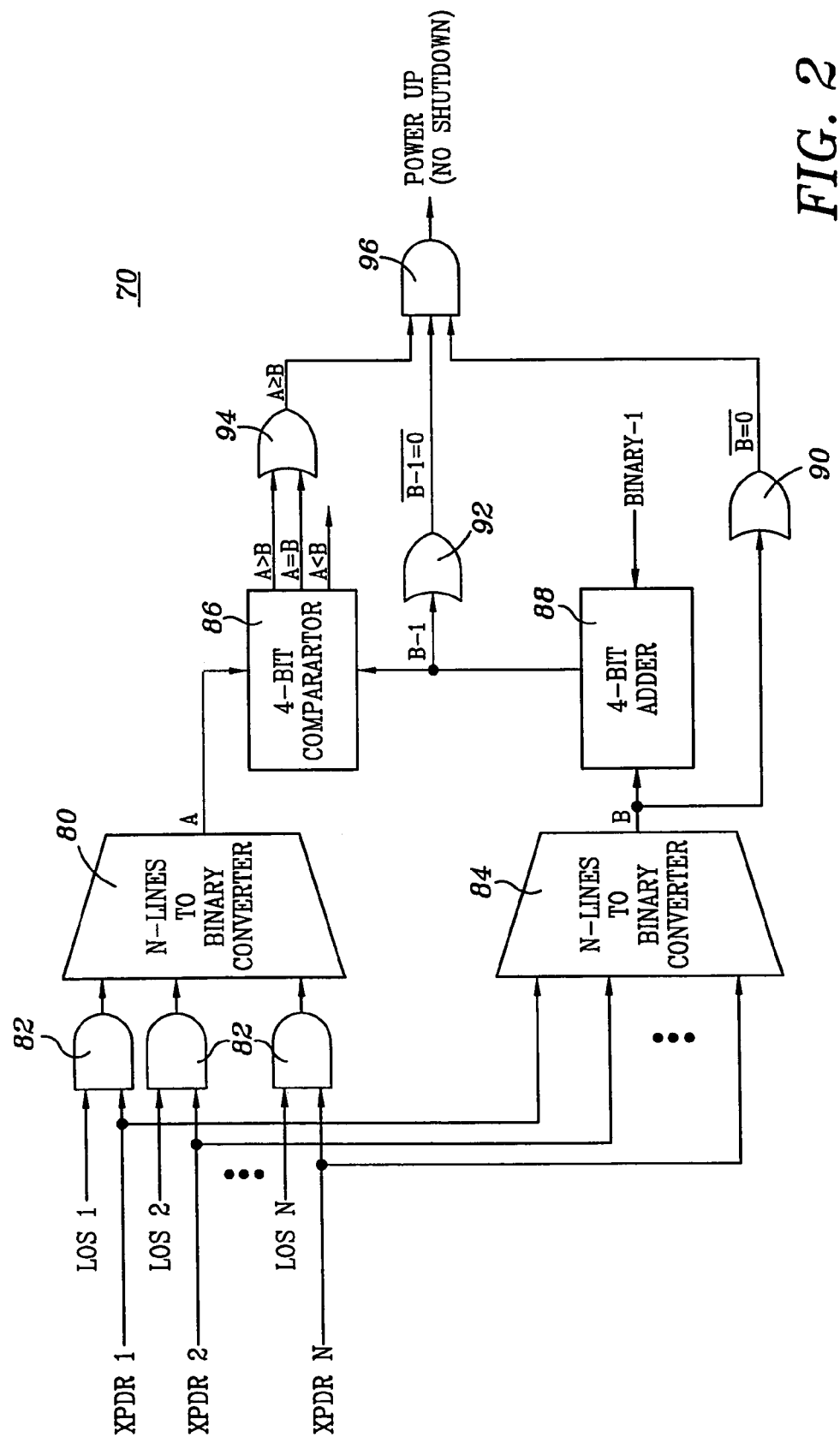
FIG. 2 is a logic block diagram of an embodiment of the present actuating system.

FIG. 2 illustrates a discrete logic implementation of SRC 70, it being understood, that SRC 70 may be implemented in a field programmable gate array. The output of RWA 68 includes a loss of signal (LOS) not detected input and a transponder present and in service signal (XPDR). The LOS and XPDR input lines are designed as normally open contact closures. XPDR is a closed contact, and opens when the associated RWA 68 module is removed or not in service. LOS is a contact closure that is closed when a valid signal is present and detected and opens when no signal or an invalid signal is detected. This method of using normally open contacts that are closed to indicate valid condition provides a degree of improved reliability. Each LOS and XPDR signal is applied to a binary converter 80 via AND gates 82 and to a binary converter 84. The output of binary converter 80 represents the number of valid signals, no loss of signal. The output of binary converter 84 represents the number of in service RWAs 68. The output of converter 80 (A) representing the number of valid signals of in service RWAs 68 is applied to a comparator 86. The output of converter 84 (B) is applied to an adder 88 and an OR gate 90. The output of adder 88 is applied to comparator 86 and an OR gate 92. The output of comparator 86 representing the number of in service valid signals being greater than or equal to the majority number calculated by adder 88 is applied to an OR gate 94. The output of OR gate 94 is applied to an AND gate 96. AND gate 96 also receives the outputs of OR gates 90 and 92. The output of AND gate 96 is applied to shutdown controls 40, 54, and 58. The output of SRC 70 is activated, no shutdown occurring if, for example, 7 of 8 RWAs 68 or 8 of 8 indicate no loss of signal detected. The output of SRC 70 is deactivated, shut down occurring when, for example, 6 of 8 or less of RWAs 68 indicate valid signal detection. Therefore, SRC 70 performs a voting logic function, such that if less than a majority of the RWAs 68 that are in service indicate a valid signal is detected, then shut down will occur. The reliability calculation thus requires at least two RWAs 68 failing to report valid signal detection for the shutdown control to be failed. A RWA 68 will be not be in service if it detects a failure within itself or its power fails.

It therefore can be seen that the present invention provides for a reliable control for a safety shutdown of a fiber optic communications network that will not be inhibited by reception of noise power or incorrect signals as well provided for a system that will reliably tolerate partial failure of transponder modules.

Whereas the present invention has been described with respect to specific embodiments thereof, it will be understood that various changes and modifications will be suggested to one skilled in the art and it is intended to encompass such changes and modifications as fall within the scope of the appended claims and is not limited to specific components and features, individually or in combination which have been disclosed. Such components and features are not the only types of systems components and features that can create signal degredations that are resolved by the use of the present invention.

The invention claimed is:

1. In a fiber optic communications network having a transmitter and a receiver connected by an optical transmission line, the receiver having multiple output data channels for providing signals to terminal devices, each output data channel including a demodulator to detect and recover a received valid data signal, and a network including at least one optical amplifier having a shutdown input, a system for detecting a disconnect in the optical transmission line comprising:

means connected to each demodulator for an output data channel for sensing the presence of a received valid data signal which includes correct data content;

means for detecting whether a predetermined number of received valid data signals for the multiple output data channels are present at a predetermined number of the multiple demodulators; and means for activating the shutdown input of the optical amplifier if the predetermined number of received valid data signals is not detected.

2. The system of claim 1 wherein said means for determining whether a predetermined number of received valid signals are present includes means for formulating a ratio of the number of received valid data signals are present to the number of operational demodulators.

3. A fiber optic WDM communications network comprising:

multiple wavelength transmitters and multiple wavelength receivers connected by a WDM optical transmission system;

said multiple wavelength receivers including multiple channel receivers for providing data signals to terminal devices, each of said channel receivers including a demodulator to detect and recover a valid received data signal at a correct data rate, and for generating an output signal;

an optical amplifier coupled to said optical transmission line, said optical amplifier having a shutdown input;

means connected to said demodulators for sensing the absence of said valid data signals;

means for determining whether a predetermined number of said valid data signals are present, and for generating a shutdown signal when said predetermined number is insufficient, wherein said means for determining includes a counter for counting the number of said demodulators in operation, and wherein said number of valid data signals is less than the predetermined majority number of operating demodulators; and means for applying said shutdown signal to said optical amplifier shutdown input to thereby terminate optical amplifier operation.

4. A fiber optic WDM communications network comprising multiple wavelength transmitters and multiple wavelength receivers connected by a WDM optical transmission system;

said multiple wavelength receivers including multiple channel receivers for providing data signals to terminal devices, each of said channel receivers including a demodulator to detect and recover a valid received data signal with correct coding, and for generating an output signal;

an optical amplifier coupled to said optical transmission line, said optical amplifier having a shutdown input;

means connected to said demodulators for sensing the absence of said valid data signals;

means for determining whether a predetermined number of said valid data signals are present, and for generating a shutdown signal when said predetermined number is insufficient, wherein said determining means includes means for determining whether a predetermined majority number of said demodulators have detected a valid data signal and for generating a ratio of the number of valid data signals present to the number of operational demodulators; and means for applying said shutdown signal to said optical amplifier shutdown input to thereby terminate optical amplifier operation.

5. A method for detecting a disconnect in an optical transmission line of a fiber optic communications network having a transmitter and a receiver connected by the optical transmission line, the receiver having multiple output data channels for providing data signals to terminal devices, each output data channel including a demodulator to detect and recover a received data signal, and a network including at least one optical amplifier having a shutdown input, the method comprising:

sensing at the demodulator the presence of a valid data signal having a correct data format;

detecting whether a predetermined number of valid data signals are present at the demodulators; and activating the shutdown input of the optical amplifier if the predetermined number of valid data signals is not detected.

6. The method of claim 5 wherein determining whether a predetermined number of valid data signals are present includes:

formulating a ratio of the number of valid data signals present to the number of operational demodulators.

7. An optical node for transmitting and receiving a wavelength-division multiplex (WDM) signal and having at least one amplifier associated with the optical node, comprising:

a demultiplexer for separating multiple wavelengths from the WDM signal and outputting the multiple wavelengths;

a plurality of receive wavelength adapters that each receive one of the multiple wavelengths outputted from the demultiplexer, wherein each of the plurality of receive wavelength adapters monitors a data signal of their inputted wavelength and outputs a loss of signal in response to invalid data content; and a shutdown-restart control that receives loss of signal outputs from each of the plurality of receive wavelength adapters and in response to a predetermined number of loss of signal outputs, activating a mechanism to shut down at least one amplifier associated with the optical node.

8. The optical node of claim 7, wherein each of the plurality of receive wavelength adapters output a loss of signal in response to one or more of the following: if the received power of the inputted wavelength is lost, the received power is random noise, the received power is a signal that is in wrong data format, the received power is a signal that is at a wrong data rate, the inputted wavelength has a wrong identification code or the inputted wavelength has a wrong signal trace code.

9. The optical node of claim 7, wherein the at least one associated optical amplifier amplifies the received WDM signal.

10. The optical node of claim 7, wherein the at least one associated optical amplifier amplifies a WDM signal transmitted by the optical node.

11. The optical node of claim 10, wherein the at least one associated optical amplifier is located at the optical node.

12. The optical node of claim 10, wherein the at least one associated optical amplifier is located remotely from the optical node.

13. The method of claim 7 wherein determining whether a predetermined number of valid data signals are present includes:

formulating a ratio of the number of valid data signals present to the number of operational receive wavelength adapters.

* * * * *